(12) United States Patent
Chatterjee

(10) Patent No.: US 8,547,798 B2
(45) Date of Patent: Oct. 1, 2013

(54) MICROPOSITIONING APPARATUS

(76) Inventor: Manjirnath Chatterjee, San Francisco, CA (US)

( * ) Notice: Subject to any disclaimer, the term of this patent is extended or adjusted under 35 U.S.C. 154(b) by 537 days.

(21) Appl. No.: 12/241,033

(22) Filed: Sep. 29, 2008

(65) Prior Publication Data

US 2009/0089007 A1    Apr. 2, 2009

Related U.S. Application Data

(60) Provisional application No. 60/975,797, filed on Sep. 27, 2007.

(51) Int. Cl.
*G01C 9/00* (2006.01)
(52) U.S. Cl.
USPC ........................................ 367/123; 367/127

(58) Field of Classification Search
USPC ................ 367/127, 118, 907; 702/150–153; 178/18.04, 19.02
See application file for complete search history.

(56) References Cited

U.S. PATENT DOCUMENTS

| 4,991,148 | A | * | 2/1991 | Gilchrist | 367/907 |
| 5,412,619 | A | * | 5/1995 | Bauer | 367/907 |
| 2006/0241893 | A1 | * | 10/2006 | Van Thong et al. | 702/150 |
| 2009/0089007 | A1 | * | 4/2009 | Chatterjee | 702/150 |

* cited by examiner

*Primary Examiner* — Daniel Pihulic

(57) ABSTRACT

The present invention allows the simple measurement of position and orientation with low cost setup and simple calibration using a small set of transmitting nodes and a simple handheld wand. This can be used in place of measuring tools such as non contact reflection based ultrasonic measurement tools or traditional tools such as tape measures and rulers where multiple high precision measurements are needed with minimal set up time. The present invention also provides true three dimensional output and orientation calculation.

10 Claims, 6 Drawing Sheets

MICROPOSITIONING APPARATUS

CROSS-REFERENCES TO RELATED APPLICATIONS

This application claim the benefit of U.S. Provisional Patent Application 60/975,797 filed on Sep. 27, 2007, all of which are incorporated herein by reference.

BACKGROUND

The present invention relates to measuring devices such as those used by contractors to determine square footage of house for carpet delivery, measurement of surfaces for counter cutting such as granite slabs, or for use in industry so that robots and industrial machinery can accurately track their end effector positions.

DESCRIPTION OF THE INVENTION

Figure 1:
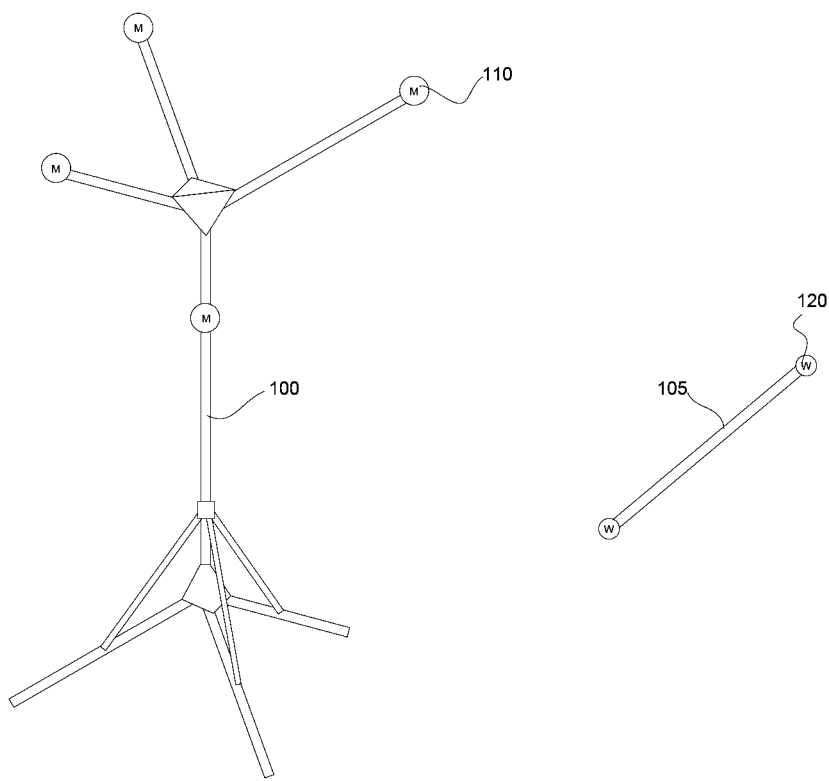
FIG. 1 Shows an overall depiction of the present invention.

The present invention works by setting 3 or more (preferable 4 or more) transmitting nodes and two receiving nodes. The transmitting nodes should be fixed in orientation, such as part of attached to a walls in a room, or as part of a single apparatus such as on a tripod like assembly as depicted FIG. 1. The nodes are depicted by the circles with the letter M, while the receiving nodes are depicted by the nodes W on a portable wand. Electronics in the wand determine the time difference of a signal emanating from each of the individual nodes to the two endpoints on the wand. By measuring the four delta times of pulse from each given node to the two endpoints a simultaneous system of equations allows the deduction of the two endpoints of the wand in free space relative to the nodes on the tripod. The system allows one set of fixed emitters to function with multiple receivers as is possible in a factory environment.

FIG. 1A portable tripod 100 contains several transmitters 110 which each emit a signal from the nodes marked M (100), to a wand 105 which receives said signal is received at the nodes marked W 120. Based on the received signal's relative delay from each node M to each node W, the position and orientation of the wand can be calculated.

Figure 2:
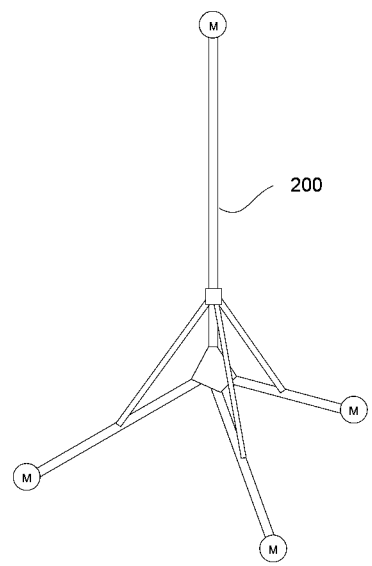
FIG. 2. Depicts an alternate simple setup for the invention reference platform.

FIG. 2 depicts a lower cost portable Tripod setup 200 where merely positioning the tripod in a room requires no extending arms. The only requirement for the emitter nodes is that they be placed as far apart as possible and that set of 4 emitters is not coplanar.

Figure 3:
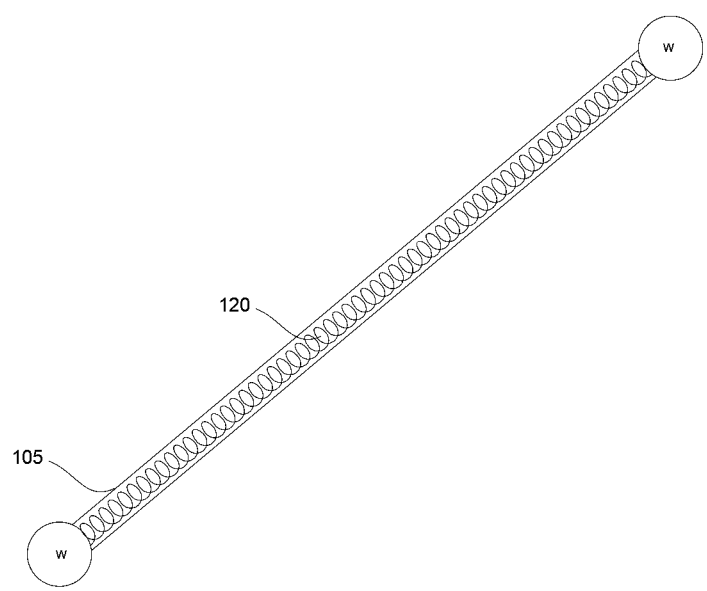
FIG. 3. Shows a handheld wand which contains an internal connection between its end effectors used in transmitting delay information from one end to the other.

FIG. 3 shows depicts the wand 105 with an internal path for taking the received signal from the receiving nodes 120.

Figure 4:
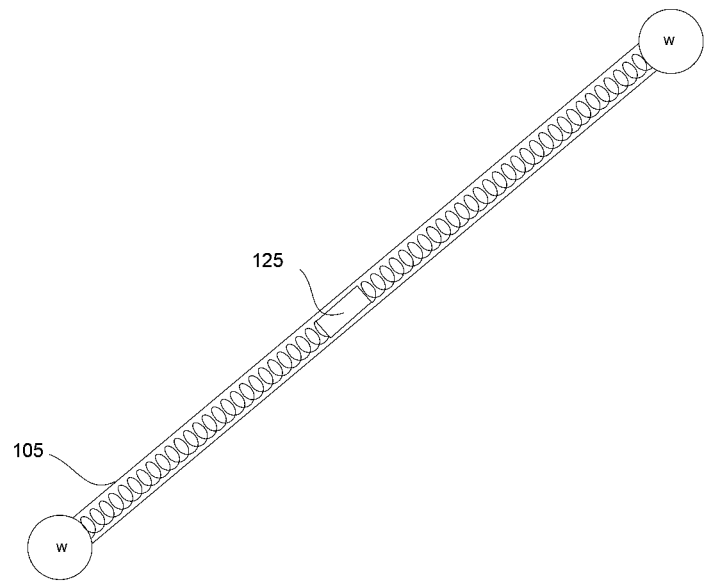
FIG. 4. Shows a handheld wand with a delay measurement circuit in the middle.

FIG. 4 shows the wand with a circuit 125 which measures the relative delay of the received signal from each of receiver nodes.

Figure 5:
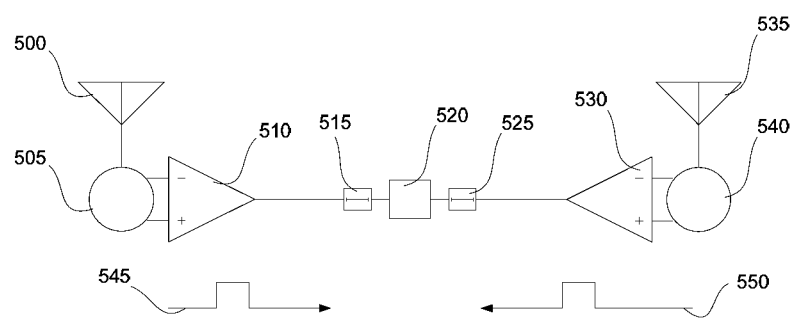
FIG. 5. Shows a block diagram of a delay measurement circuit.

FIG. 5 shows a block diagram of the circuit 125 FIG. 4. Here the receiving gyrator (500) which could be receiving acoustic or RF energy is conducted via node 505 to amplifier 510 and sent to delay line 515. A similar set of circuits takes the energy received at the other end of the wand 535 to combiner 540 and amplifier 530 where that energy is then sent to delay line 525. The delay is calculated by the difference calculator 520. The relative pulse-waves 545 and 550 depict the information transmitted from the receiving end of the wands towards the pulse delay calculator 520.

Figure 6:
FIG. 6. Shows a single portion of a wire line delay element.
Figure 7:
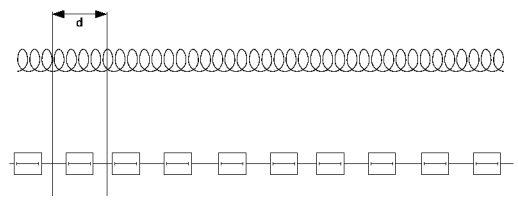
FIG. 7. Depicts several delay elements, here modeled as box elements with a wave traveling from element to element.
Figure 8:
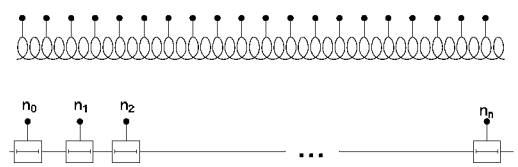
FIG. 8. Depicts several delay elements each with an output tap.
Figure 9:
FIG. 9. Depicts two waves traveling towards each other along the taps.
Figure 9:
Figure 10:
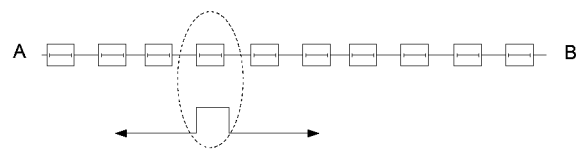
FIG. 10. Represents the element where upon the two traveling waves have intersected.

If RF energy is used (e.g. RF pulses) instead of ultrasonic pulses it may be necessary to find alternate means by which to measure the time differences as the resolution needed may require prohibitively expensive circuitry for mass market applications. Using a delay line in the body of the wand to slow down RF based signals can accomplish this. This is necessary since RE energy travels near the speed of light. Assuming the to wand endpoints to be ⅓ of a meter then the time propagation from 1 end to the other is on the order 1 ns which is a very small time period to accurately measure with low cost electronics. This can be enhanced by delaying the time it takes the signal to propagate and then measuring where on the wand the signal from the two ends meet. FIG. 6 shows a small loop of wire for this case. Here rather then moving a single mm forward, a loop of X mm in diameter will induce a delay of X*Pi times longer a propagation. Combined with a pitch of Y loops per mm, we can make a delay line which stretches the time out for a pulse to propagate from one end to the other by X*Y*Pi times. For example a 10 mm diameter coiled transmission line with a pitch of 4 turns per mm, will induce a delay of 10*4*pi which is about 120 times longer so our 1 ns delta becomes 120 ns. This allows us to use low cost electronics by tapping the transmission line and comparing where the pulse arriving at the two ends of the wand meet as shown in FIG. 7, FIG. 8, and FIG. 9. By using the delay lines and using simple circuitry to see where to arriving pulses meet we can determine what the actual delta time delay is from a pulse sent from a given transmitting node to each end node is. FIG. 10 depicts a single delay line where the two signals from each end have met. A circuit for detecting the two pulses meeting up is shown in block diagram form in FIG. 11.

Figure 11:
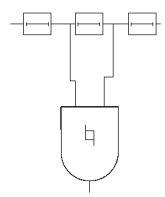
FIG. 11. Represents a symbolic representation of an intersection test circuit.
Figure 12:
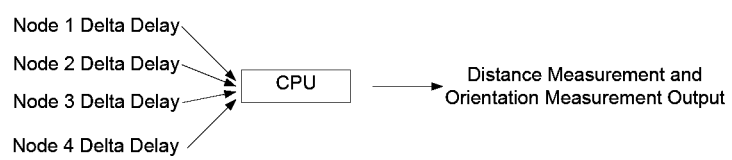
FIG. 12. Represents an overview of the block diagram of the computational system.

Each delay from each transmitting node is measured sequentially. This is accomplished by having each transmitting node emit its signal in turn followed by the next and then the next. The combined delta delays of the received signal for each transmitting node combine to produce a set of equations which can be solved to compute the position of each of the two wand endpoints relative to the set of transmitting nodes and the relative orientation of the two wand endpoints to each of the transmitting nodes (see FIG. 12). FIG. 11 depicts a block diagram of a CPU system which provides the measurement output. The transmitting nodes can use ultrasound or RF energy as methods of sending fixed time constant waves to the receiving wand.

The invention claimed is:

1. An apparatus for measuring position and orientation comprising:
   a receiving device for taking measurements comprising two or more receivers, the receiving device using a transmission delay line in order to slow a time propagation from a first end of the receiving device to a second end of the receiving device to allow for slower circuitry to be able to perform high precision delta time measurements, wherein a first receiver is located at the first end and a second receiver is located at the second end; and
   a set of emitters for transmitting synchronized information in a form of pulsed waves to the device.

2. The apparatus of claim 1, wherein the receiving device is a contractor's tool and has a readout displaying the position of the receiving device.

3. The apparatus of claim 1, wherein the apparatus can be calibrated by simply touching the receiving device to a fixed known point.

4. The apparatus of claim 1, wherein the set of emitters are provided on a tripod device.

5. The apparatus of claim 1, wherein the transmission delay line is a made of wire.

6. The apparatus of claim 1, wherein the two or more receivers receive the pulsed waves as acoustic energy.

7. The apparatus of claim 1, wherein the transmission delay line is a double transmission line where the pulsed waves received from the set of emitters pass each other, and wherein comparison via the two transmission lines is used to determine where the pulsed waves meet.

8. The apparatus of claim 1, wherein set of emitters transmit synchronized information to the receiving device using sonic waves.

9. The apparatus of claim 1, wherein the set of emitters transmit synchronized information to the receiving device using radiofrequency electromagnetic pulses.

10. The apparatus of claim 1, wherein the receiver device automatically transmits the received synchronized information to a centralized source.

* * * * *